US012316040B2

(12) United States Patent
Bolliger et al.

(10) Patent No.: US 12,316,040 B2
(45) Date of Patent: May 27, 2025

(54) SOCKET BODY

(71) Applicant: Staubli Electrical Connectors AG, Allschwil (CH)

(72) Inventors: Lars Bolliger, Allschwil (CH); Patrick Beltzer, Jettingen (FR)

(73) Assignee: Stäubli Electrical Connectors AG, Allschwil (CH)

( * ) Notice: Subject to any disclaimer, the term of this patent is extended or adjusted under 35 U.S.C. 154(b) by 239 days.

(21) Appl. No.: 17/781,584

(22) PCT Filed: Dec. 1, 2020

(86) PCT No.: PCT/EP2020/084063
§ 371 (c)(1),
(2) Date: Jun. 1, 2022

(87) PCT Pub. No.: WO2021/110649
PCT Pub. Date: Jun. 10, 2021

(65) Prior Publication Data

US 2023/0006388 A1 Jan. 5, 2023

(30) Foreign Application Priority Data

Dec. 2, 2019 (CH) ..................................... 01523/19

(51) Int. Cl.
*H01R 13/11* (2006.01)

(52) U.S. Cl.
CPC .................................. *H01R 13/111* (2013.01)

(58) Field of Classification Search
CPC .............................. H01R 11/28; H01R 13/111
See application file for complete search history.

(56) References Cited

U.S. PATENT DOCUMENTS 2,280,027 A 4/1942 Busse et al.
3,740,702 A * 6/1973 Moray .................... H01R 11/11 439/825
6,227,868 B1 5/2001 Wlodarski
(Continued)

FOREIGN PATENT DOCUMENTS

CN 1675800 A 9/2005
CN 103299499 B * 3/2016 ......... H01R 13/5205
(Continued)

OTHER PUBLICATIONS

International Search Report for PCT/EP2020/084063 dated Jan. 25, 2021.

(Continued)

*Primary Examiner* — Jean F Duverne
(74) *Attorney, Agent, or Firm* — Sughrue Mion, PLLC

(57) ABSTRACT

A socket body (1) having a socket space (3), which is delimited by a socket wall (2) and extends along a central axis (M), for receiving a plug pin, the socket space (3) having a socket opening (6) via which the plug pin can be pushed into the socket space (3), wherein at least one indentation (4), viewed in cross-section transversely to the central axis (M), extends through the socket wall (2) angularly inclined at an angle (α) with respect to the central axis (M) in such a way that at least one spring clip (5) is formed, which spring clip (5) is bent into the socket space (3), and wherein the spring clip (5) has at the front an edge (7) facing the socket space.

30 Claims, 6 Drawing Sheets

(56) References Cited

U.S. PATENT DOCUMENTS

| | | | | |
|---|---|---|---|---|
| 6,530,808 | B1 * | 3/2003 | Hosler, Sr. ............. | H01R 24/44<br>439/585 |
| 2018/0212370 | A1 | 7/2018 | Xu | |

FOREIGN PATENT DOCUMENTS

| | | | |
|---|---|---|---|
| CN | 107636914 | A | 1/2018 |
| CN | 110289516 | A | 9/2019 |
| DE | 200 08 846 | U1 | 8/2000 |
| JP | 3-291874 | A | 12/1991 |
| JP | 2009-87919 | A | 4/2009 |
| JP | 2015-530725 | A | 10/2015 |
| JP | 2016-503951 | A | 2/2016 |
| TW | 200403901 | A | 3/2004 |
| WO | 2014/055227 | A1 | 4/2014 |

OTHER PUBLICATIONS

Search Report issued Sep. 26, 2023 in Chinese Application No. 2020800830078.

* cited by examiner

SOCKET BODY

CROSS REFERENCE TO RELATED APPLICATIONS

This application is a National Stage of International Application No. PCT/EP2020/084063 filed Dec. 1, 2020, claiming priority based on Swiss Patent Application No. 01523/19 filed Dec. 2, 2019.

TECHNICAL FIELD

The present invention relates to a socket body in accordance with the preamble of claim 1, and to a method for producing a corresponding socket body as claimed in claim 15.

PRIOR ART

Socket bodies for electric plug-in connections are known from the prior art. Such socket bodies have a socket opening, into which a plug pin can be pushed. An electric contact between the socket body and the plug pin is brought about between the outer side of the plug pin and the inner side of the socket opening.

U.S. Pat. No. 2,280,027 has disclosed a socket body with a spring clip which protrudes into the socket space. The socket body according to U.S. Pat. No. 2,280,027 has various disadvantages. The mechanical abrasion during the plug-in operation is comparatively high in the region of the spring clip. In addition, the contacting between the spring clip and the plug pin of a plug pin which is pushed into the socket space is geometrically undefined and is therefore disadvantageous.

SUMMARY OF THE INVENTION

Proceeding from this prior art, it is an object of the invention to provide a socket body which overcomes the disadvantages of the prior art. In particular, it is an object of the present invention to specify a socket body which comprises a spring clip which provides improved contact properties for a plug pin.

The subject matter of claim 1 solves this object. According to said claim 1, a socket body comprises a socket space which is delimited by a socket wall and extends along a center axis for receiving a plug pin. The socket space has a socket opening, via which the plug pin can be pushed into the socket space. At least one cut extends through the socket wall in such a way that at least one spring clip is formed, which spring clip is bent into the socket space. The spring clip has, on the front side, an edge which faces the socket space. The spring clip has at least one, in particular precisely a single, indentation which is configured in such a way that one contact location, preferably one contact point, for making contact with a plug pin which is to be pushed into the socket space is formed on either side of the indentation.

The indentation provides determined contact locations or contact points which improve the electric contact between the socket body and the plug pin.

Furthermore, the determined contact is advantageous for the actual contact process, in which the plug pin is pushed into the socket space, because the mechanical abrasion in the region of the edge can be reduced in comparison with an edge without an indentation. As a result, a higher number of plug-in cycles is made possible with unchanged contact properties.

The arrangement of a single indentation is advantageous with regard to the electric contacting. In the case of large diameters, having several indentations decreases, in particular, the mechanical abrasion.

Preferably, at least one of the indentations lies centrally on the spring clip as viewed in the direction of the center axis. In other words, the indentation lies centrally in the edge which delimits the spring clip, as viewed from the socket opening.

As a result, an arrangement which is symmetrical with regard to the plug pin may be obtained in the direction of the center axis, which optimizes the forces during pushing in of the plug pin. In addition, the plug pin is easily centered in the socket space.

In a first embodiment, the spring clip has, on the front side, an edge which faces the socket space, wherein said indentation is arranged at the edge.

In summary, a socket body according to the first embodiment comprises a socket space which is delimited by a socket wall and extends along a center axis for receiving a plug pin. The socket space has a socket opening, via which the plug pin can be pushed into the socket space. At least one cut extends, as viewed in cross section transversely with respect to the center axis, in an angularly inclined manner at an angle with respect to the center axis through the socket wall, in such a way that at least one spring clip is formed, which spring clip is bent into the socket space. The spring clip has, on the front side, an edge which faces the socket space. At the edge, the spring clip has at least one, preferably precisely a single, indentation which is configured in such a way that one contact point for making contact with a plug pin which is to be pushed into the socket space is formed on each side of the indentation.

In addition to the advantageous electric contacting, a possible burr on the edge which remains on the spring clip due to production is removed at least at the contact point, at which the spring clip comes into contact with the plug pin. The burr is deburred by way of the indentation. A burr of this type typically increases the mechanical abrasion.

The at least one indentation preferably interrupts the edge completely in the region of the indentation. That is to say, the edge is substantially no longer present in the region of the indentation due to the arrangement of the indentation.

The at least one indentation preferably extends into a front face, facing the socket opening, of the spring clip and/or into a wall face, facing the socket opening, of the spring clip.

Here, the front face is the face which can be seen when looking via the socket opening into the socket space.

The at least one indentation particularly preferably extends into a front face, facing the socket opening, of the spring clip and into a wall face, facing the socket opening, of the spring clip. This ensures that the edge is interrupted reliably during the production process.

Preferably, the at least one indentation extends from the edge, as viewed in a direction transversely with respect to the center axis, completely over the front face, or the at least one indentation extends from the edge, as viewed in a direction transversely with respect to the center axis, at most over half of the front face. The direction transversely with respect to the center axis can also be understood to be a radial direction.

The contact points are preferably formed on the edge, and, in particular, the contact points each lie at an end point of the edge which forms the transition to the indentation.

Preferably, opposite the indentation with the two contact points with regard to the center axis, a third contact point is provided by the surface of the socket wall.

As a result, three contact points are formed. The contact points preferably lie in such a way that the contact points are the corner points of an isosceles, acute triangle. As a result, a situation is achieved where the contact points are connected to the plug pin at three locations.

Depending on the configuration of the surface of the socket wall, the third contact point is provided by a contact line. That is to say, the third contact point is part of the contact line.

The third contact point preferably lies between the two contact points as viewed in the direction of the center axis, in such a way that a line which extends at a right angle with respect to the center axis and through the third contact point runs centrally between the two contact points which are provided the indentation. As a result, a contacting which is symmetrical with regard to the plug pin may be provided.

The cut preferably extends, as viewed in cross section transversely with respect to the center axis, in an angularly inclined manner at an angle ($\alpha$) with respect to the center axis.

The cut preferably runs over a first section in an angularly inclined manner at the angle ($\alpha$) with respect to the center axis, and runs in a second section parallel to the center axis.

If the angle $\alpha$ runs flatly with respect to the center axis, the second section can be omitted. If the angle $\alpha$ runs steeply with respect to the center axis, the second section is advantageous for the spring action of the spring clip.

Preferably, said cut faces of the section which runs at an angle with respect to the center axis are preferably part of a face of a planar cylindrical section, which cylindrical section runs in an angularly inclined manner with respect to the center axis.

The cut may however also be a rounded cut, which, as a result of the rounding, also runs in small sections in an angularly inclined manner with respect to the center axis.

In the following, further optional and advantageous features of the socket body according to the first embodiment will be described.

The spring clip is oriented with its free end toward the socket opening. That is to say, during pushing into the socket space, the plug body already comes into contact with the spring clip at a relatively small push-in depth. As a result, the required plug-in force rises rapidly, whereby a defined push-in procedure is enabled. The spring clip may also, however, be oriented with its free end away from the socket opening.

The number of cuts may be variable depending on the embodiment, which also varies the number of spring clips. This means that at least one further cut forms a further spring clip which is configured substantially identically to said first spring clip. In these variants, two or three or four or more cuts and the corresponding number of spring clips are conceivable. The cuts are preferably arranged in a distributed manner around the circumference of the socket body, the spacings between the cuts being identically configured. It is also possible that a plurality of cuts are arranged spaced apart from one another in the direction of the center axis.

Depending on the configuration and number of spring clips, the electric contact is either

- provided between the plug pin which is pushed into the socket space and between the surface of the socket space and the spring clip; or
- is provided between the plug pin which is pushed into the socket space and the spring clip.

Preferably, the cut is arranged in such a way that a cylindrical guide path, extending from the end face of the socket body into the socket space, is formed for receiving the plug pin, which cylindrical guide path has an inner wall which runs completely around the center axis. As viewed in the push-in direction, the socket opening is adjoined first of all by the cylindrical guide path, wherein subsequently with further increasing depth into the socket space, the spring clip protrudes into the socket space. That is to say, in other words, the socket opening is adjoined by a cylindrical guide path which correspondingly guides the plug pin with its inner wall during pushing into the socket opening. This has the advantage that the center axis of the plug pin is oriented collinearly with respect to the center axis of the socket space before the plug pin comes into contact with the spring clip.

Preferably, the cut is delimited on the upper side by the upper cut face and on the lower side by a lower cut face, which cut faces preferably extend parallel to one another in the case of an unbent spring clip. In the deformed state, the spring clip preferably lies in such a way that the upper cut face comes into contact with its free end with the lower cut face. A simple and nevertheless defined deformation of the spring clip is made possible by way of this contact during the production of the socket body. As an alternative, in the deformed state, the spring clip preferably lies in such a way that the upper cut face does not come into contact with its free end with the lower cut face.

The cut is therefore delimited substantially by the upper and the lower cut face. In conjunction with the cut faces, the terms upper and lower are to be understood in such a way that the lower cut face lies closer to the socket space, as viewed in cross section, than the upper cut face.

The cut faces preferably extend in each case through the shell face into the socket body. In other embodiments, it is also conceivable that at least the lower cut face extends from the end face of the socket body into the socket body. That is to say, the cut extends from the shell face and the end face into the socket body.

Further advantageous embodiments are characterized

- in that the cut extends completely through the socket body as viewed transversely with respect to the center axis and parallel to its cut faces; and/or
- in that the cut has a cut width which is smaller than 10% of the maximum cut depth as viewed in the direction of the center axis;
- and/or
- in that the cut lies, as viewed in cross section, at an angle $\alpha$ of from 30° to 60°, in particular at an angle of from 40° to 50°, in particular 45°, with respect to the center axis.

Preferably, the cut width is larger in the case of socket bodies with larger diameters than in the case of socket bodies with smaller diameters. That is to say, a cut with a larger cut width is provided in the case of a socket body with a large diameter, while a cut with a smaller cut width is provided in the case of a socket body with a small diameter.

The recess face and said cut faces are preferably planar faces. A planar face is understood to mean a face which extends in one plane.

According to a second embodiment, the spring clip has a wall face which faces the socket space, the wall face which faces the socket space having a region with a decreased diameter, and the indentation extending into the wall face in the region with the decreased diameter.

Preferably, the region with the decreased diameter has a diameter which is smaller than the diameter of the socket opening. Particularly preferably, the wall face extends, after a cylindrical section which adjoins the socket opening, conically as far as the decreased diameter, and then widens again conically. The indentation is then arranged in the transition of the two cones.

Preferably, said region has a minimum internal diameter, the indentation extending through this minimum internal diameter as viewed in the direction of the center axis.

Preferably, there are at least two spring clips, which spring clips are arranged in a uniformly distributed manner around the circumference. Particularly preferably, there are at least three spring clips which ensure good centering and contacting of the plug in the socket space.

Preferably, the at least one spring clip is connected on each end to the socket wall, and the region with the decreased diameter lies between the two connection locations.

Preferably, the cut runs parallel to the center axis in the case of the second embodiment. The spring clip is provided by way of two cuts which lie on the sides of the spring clip.

Preferably, the spring clip according to the second embodiment is preferably arranged in such a way that a cylindrical guide path which extends from the end face of the socket body into the socket space is formed for receiving the plug pin, which cylindrical guide path has an inner wall which runs completely around the center axis. As viewed in the push-in direction, the socket opening is adjoined first of all by the cylindrical guide path, wherein subsequently with further increasing depth into the socket space, the spring clip protrudes into the socket space. That is to say, in other words, the socket opening is adjoined by a cylindrical guide path which correspondingly guides the plug pin with its inner wall during pushing into the socket opening. This has the advantage that the center axis of the plug pin is aligned collinearly with respect to the center axis of the socket space before the plug pin comes into contact with the spring clip.

In the following, general features which may optionally be used in the case of all embodiments will be described.

The indentation preferably extends, with regard to the circumference of the socket space, over a circumferential angle of at most 25°, of, in particular, at most 10° or of at most 5°. The circumferential angle is preferably dependent on the diameter of the socket opening. The circumferential angle is preferably likewise larger in the case of a large diameter, while the circumferential angle likewise gets smaller in the case of a smaller diameter.

The at least one indentation may be produced in various ways.

In one embodiment, the at least one indentation is provided by way of a stamped location. The indentation can be produced, for example, by way of an embossing stylus which is guided via the socket opening through the socket space as far as the edge. By way of a corresponding application of force to the embossing stylus, the edge is deformed, with the result that said indentation is produced.

In another embodiment, the at least one indentation is provided by plastic reshaping and/or machining of the edge.

In the case of machining, a corresponding tool, such as a deburring tool, is preferably guided via the socket opening into the socket space, the edge then being machined such that said indentation is created.

Preferably, the socket space or the socket opening defines a geometrical envelope cylinder with a circular cross section, the indentation lying exclusively in the interior of the envelope cylinder. The envelope cylinder preferably has the diameter of the socket opening.

This has the advantage that the indentation may be machined from the socket opening when the spring clip is already bent.

During production, preferably in a first step, the socket body is produced with the cut and the spring clip; and, preferably in a second step, the indentation is produced, a tool for producing the indentation being guided via the socket opening into the socket space as far as the edge.

A method for producing a socket body in accordance with the above description is characterized in that, in a first step, the socket body is produced with the cut and the spring clip; and in that, in a second step, the indentation is produced, a tool for producing the indentation being guided via the socket opening into the socket space as far as the location of the indentation or as far as the edge or through the diameter constriction.

Further embodiments are specified in the dependent claims.

BRIEF DESCRIPTION OF THE DRAWINGS

Preferred embodiments of the invention will be described in the following on the basis of the drawings which serve merely for explanation and are not to be interpreted as restrictive. In the drawings.

DESCRIPTION OF PREFERRED EMBODIMENTS

FIGS. 1 to 6 show a socket body 1 according to a first embodiment of the present invention, and FIGS. 7 to 12 show a socket body 1 according to a second embodiment of the present invention. Identical parts have identical reference signs. The socket body 1 is manufactured from an electrically conducting material and serves to receive a plug pin (not shown in the figures), wherein it is possible for an electric contact to be made between the socket body 1 and the plug pin.

Figure 1:
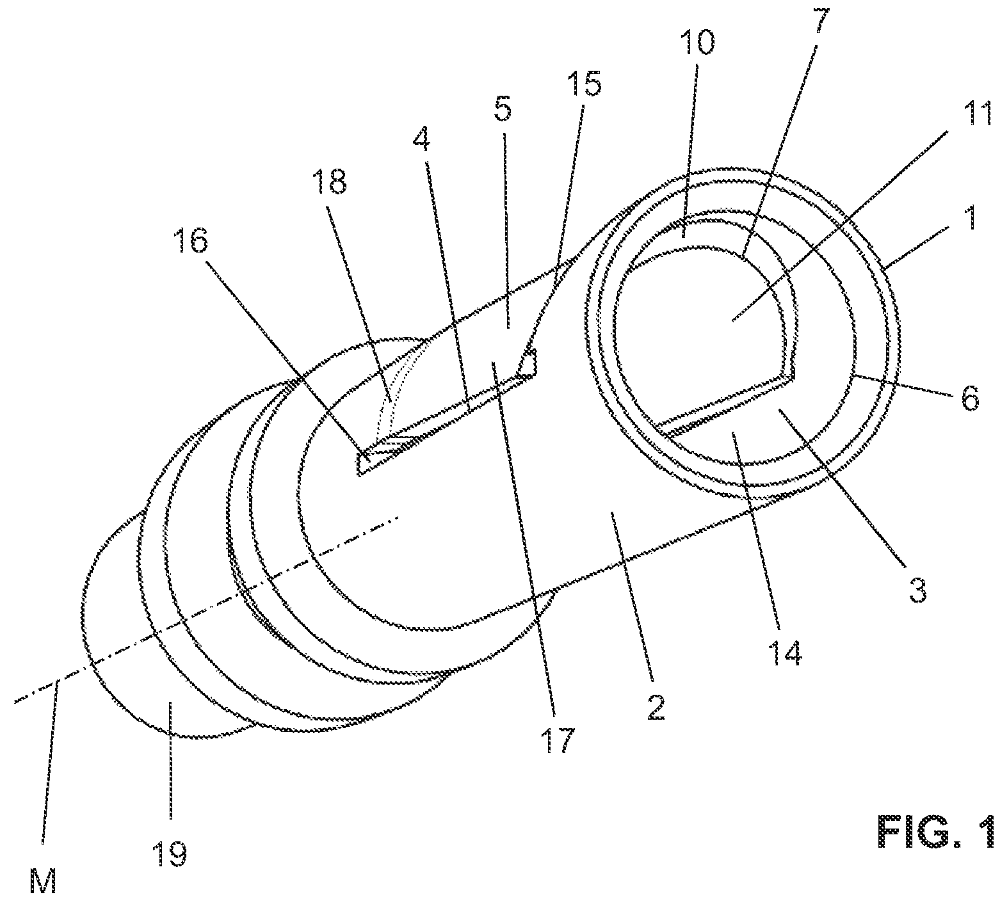
FIG. 1 shows a perspective view of a socket body in accordance with a first embodiment of the present invention before the placement of an indentation.
Figure 2:
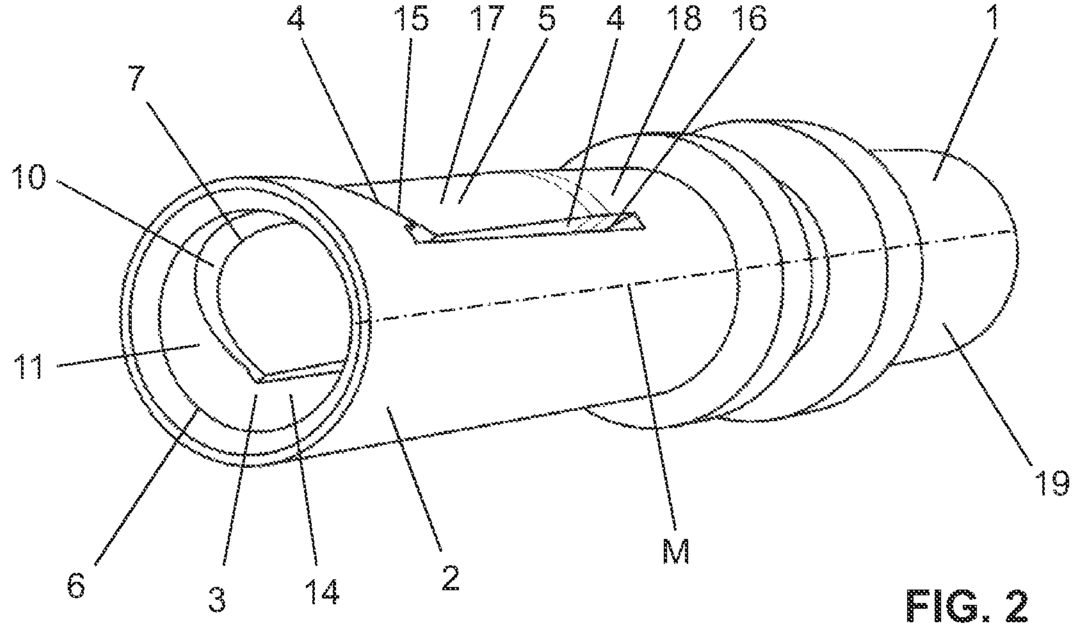
FIG. 2 shows a further perspective view of the socket body according to FIG. 1.
Figure 3:
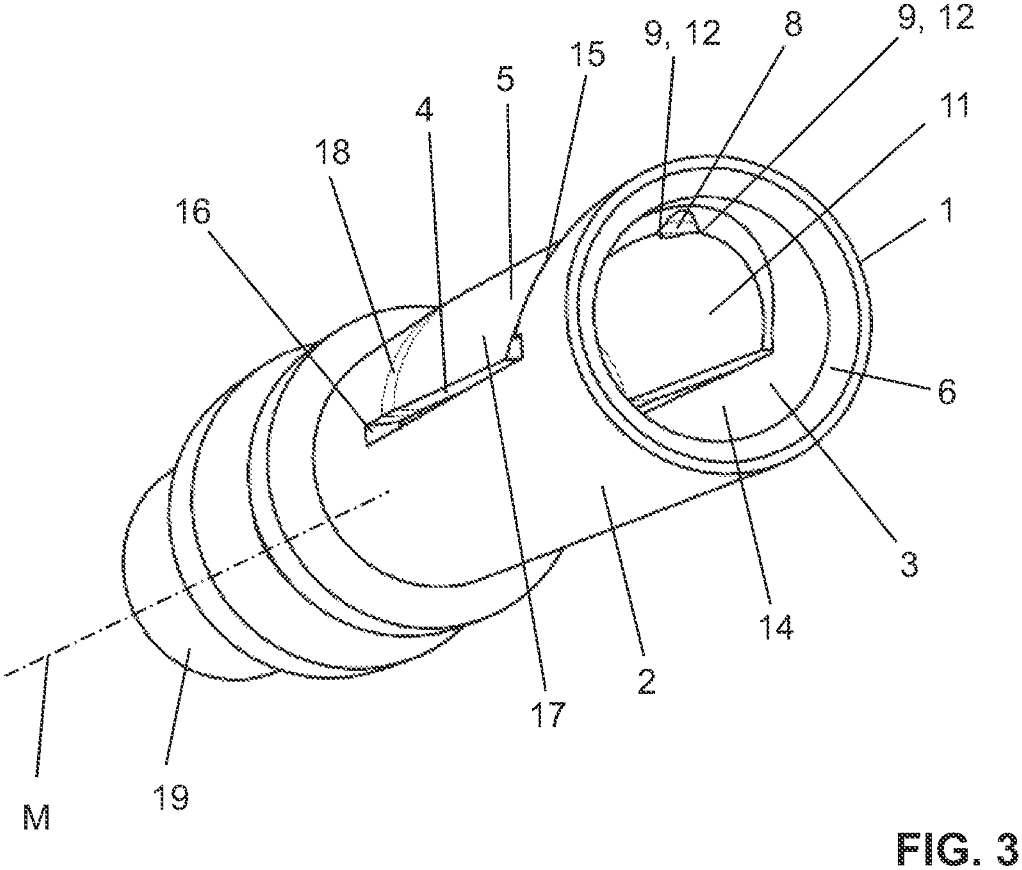
FIG. 3 shows the view according to FIG. 1 after the placement of the indentation.
Figure 4:
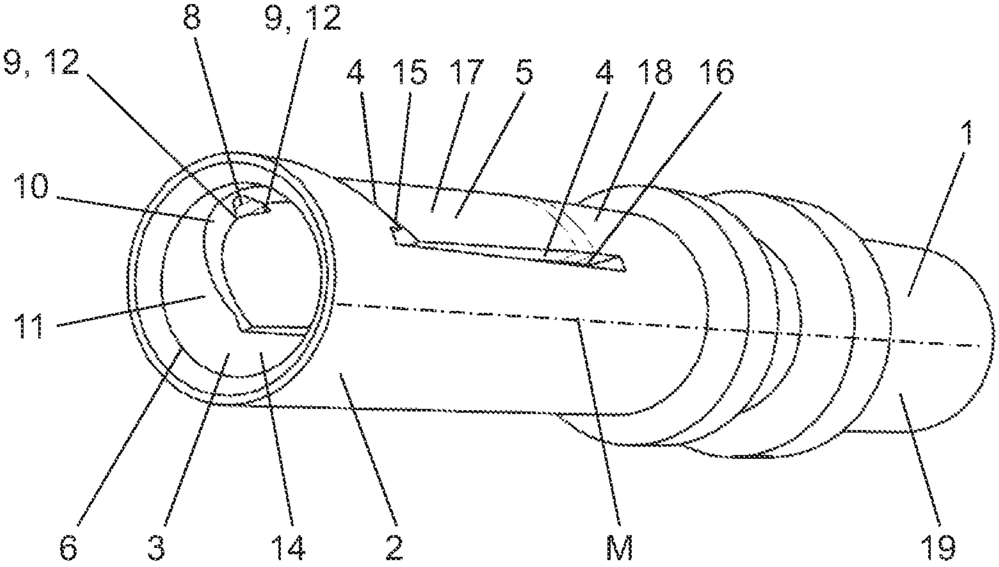
FIG. 4 shows the view according to FIG. 2 after the placement of the indentation.
Figure 5:
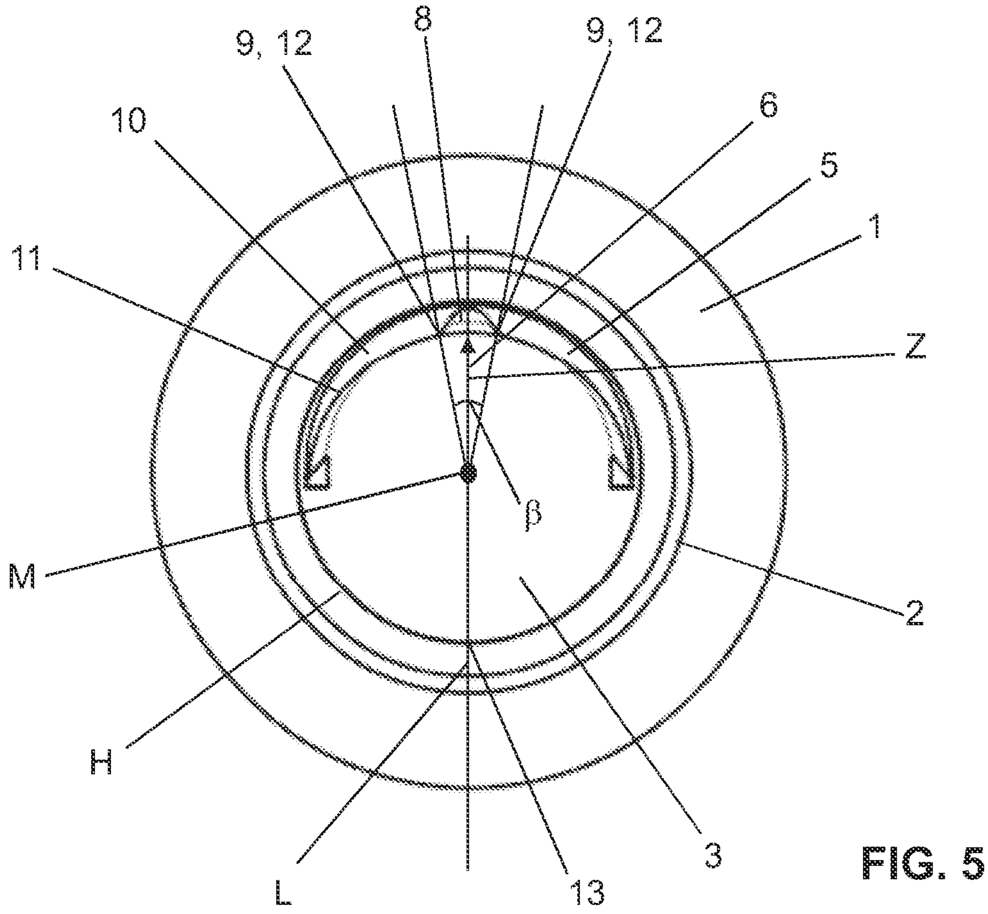
FIG. 5 shows a front view of the socket body according to FIGS. 3 to 4.

FIGS. 1 to 2 show the socket body 1 in an intermediate step during the production. FIGS. 3 to 6 show the finally produced socket body 1.

The socket body 1 according to the two embodiments comprises a socket space 3 which is delimited by a socket wall 2 and extends along a center axis M for receiving a plug pin. In the extension of the center axis M, the socket space 3 is adjoined by a contact section 19. The contact section 19 is connected to a further electric conductor (not shown in the figures), such as for example to a cable.

The socket space 3 has a socket opening 6, via which the plug pin can be pushed into the socket space 3. In the two embodiments, the socket body 1 has at least one cut 4 in the socket wall 2, by which cut 4 a spring clip 5 is formed. The spring clip 5 according to the first embodiment has a free end 17, with which the spring clip 5 protrudes into the socket space 3, and the spring clip 5 according to the second embodiment is connected on each end to the socket wall 2, the spring clip 5 protruding into the socket space 3 with its wall face 11 which faces the socket space 3.

According to the first embodiment, the cut 4 extends, as viewed in cross section transversely with respect to the center axis M, through the socket wall 2 in an angularly inclined manner at an angle α with respect to the center axis M, in such a way that at least one spring clip 5 is formed. The spring clip 5 is bent into the socket opening 3 and protrudes into the socket space 3. Between the spring clip 5 and the plug pin which is to be pushed into the socket space 3, an electric contact can be established between the plug pin and the socket body 1.

On the front side, the spring clip 5 has an edge 7 which faces the socket space 3. This is the edge 7, with which the plug pin comes into contact during the push-in operation. After the production of the socket body 1 and the spring clip 5, the edge 7 is a continuous edge, which is shown in FIGS. 1 and 2. Accordingly, the edge 7 does not have any interruption. Due to the manufacturing, it cannot be ruled out that the edge 7 has a burr which is disadvantageous for the plug-in operation. This is the case, in particular, with regard to abrasion and uncontrolled electric contact.

According to the invention, the spring clip 5 has at least one, in particular precisely a single, indentation 8 at the edge 7. The indentation 8 interrupts the edge 7 after its production. The indentation 8 is shown in FIGS. 3 to 6. The indentation 8 is arranged in such a way that one contact point 9 for contacting a plug pin which is to be pushed into the socket space 3 is formed on each side of the indentation 8. The contact point 9 is formed by the end of the edge 7 at the transition of the edge 7 into the indentation 8.

The indentation 8 which is shown in the figures is an indentation 8 which extends from the front into the spring clip 5. That is to say, the indentation 8 is arranged at the free end 17 of the spring clip 5. The free end 17 is the end which is not fixed. Opposite the free end 17 there is the fixed end 18 of the spring clip, via which fixed end 18 the spring clip 5 is connected to the socket body 1. In the embodiment which is shown, the free end 17 is oriented toward the socket opening 6, with the result that, during the push-in operation, the plug pin first comes into contact with the free end 17, that is to say with the edge 7 and the indentation 8. During the further push-in operation, the plug pin is then pushed in the direction of the fixed end 18.

The indentation 8 is a mechanical indentation which may also be called a dent or recess. The term "indentation" is understood to mean a structure which extends into the spring clip 5 and provides a corresponding cavity which may be very small. As viewed from the front in the direction of the center axis M, the indentation 8 lies centrally on the spring clip 5. This can be seen clearly in FIG. 5. Here, the indentation 8 lies directly above the center axis M. The at least one indentation 8 interrupts the edge 7 completely in the region of the indentation 8. That is to say, the edge 7, as is shown in FIGS. 1 and 2, is interrupted completely by the indentation, as shown in FIGS. 3 to 6. The edge 7 no longer exists in the region of the indentation 8.

In the embodiment which is shown, the spring clip 5 has a front face 10 which is visible from the front through the socket opening 6, and a wall face 11 which faces the socket space 3. Here, the indentation 8 extends into the front face 10 and into the wall face 11.

This is therefore an indentation 8 which, starting from the edge 7, extends both into the front face 10 and into the wall face 11. With regard to the radial direction Z transversely with respect to the center axis M, the indentation 8 extends, depending on the configuration of the spring clip 5, radially substantially completely over the front face 10, or else the indentation 8 extends from the edge 7 in the radial direction over the front face 10 by at most half of the front face 10.

With regard to the circumference of the socket space 3, the indentation 8 extends over a circumferential angle β of at most 25°, in particular at most 10° or at most 5°, around the circumference. It is accordingly a very small region in which the indentation 8 is present.

The at least one indentation 8 is preferably provided by a stamped location. A stamped location can be produced by way of plastic reshaping. In other embodiments, the indentation 8 is provided by way of plastic reshaping and/or machining of the edge 7.

As has already been mentioned, contact points 9 are formed on the edge 7; in particular, the contact points 9 are provided in each case at an end point 12 of the edge 7 which forms the transition to the indentation 8. A consideration of FIG. 5 makes it clear that, in the embodiment which is shown, a third contact point 13 is arranged opposite the indentation 8 with regard to the center axis M. The plug pin is in electric contact with the socket body 1 via three contact points 9, 13. The third contact point 13 is provided substantially by way of the surface 14 of the socket body 2 opposite the two contact points 9 or opposite the indentation 8. The third contact point 13 can be punctiform or linear.

As viewed in the direction of the center axis M, the third contact point 13 lies between the two contact points 9 in such a way that the line L which extends at a right angle with respect to the center axis M and through the third contact point 13 runs centrally between the two contact points 9 which are provided by the indentation 8. In other words, a triangle is defined between the contact points 9 and 13, which triangle is an acute triangle. Advantageous electric contacting with regard to the plug pin can be achieved by way of these three contact points.

In other embodiments, a further cut may also form a further spring clip 5 which is substantially identically configured to the above-described spring clip including the indentation 8. For example, it may be conceivable that two spring clips 5 are arranged so as to lie opposite one another, or that more than two spring clips 5 are arranged in regular angular sections with respect to one another. Here, the third contact point would then not be provided by the surface of the socket space 3, but rather by the additional spring clips or the contact points 9 which are arranged laterally with respect to the indentations 8.

The socket space 3 defines a geometrical envelope cylinder with a circular cross section. The indentation 8 lies in this case exclusively in the interior of the envelope cylinder. The envelope cylinder can be seen from FIG. 5. The envelope cylinder has the reference sign H. Such an arrangement of the indentation is advantageous because the indentation 8 can take place by way of a tool being fed in via the socket opening 6.

Figure 6:
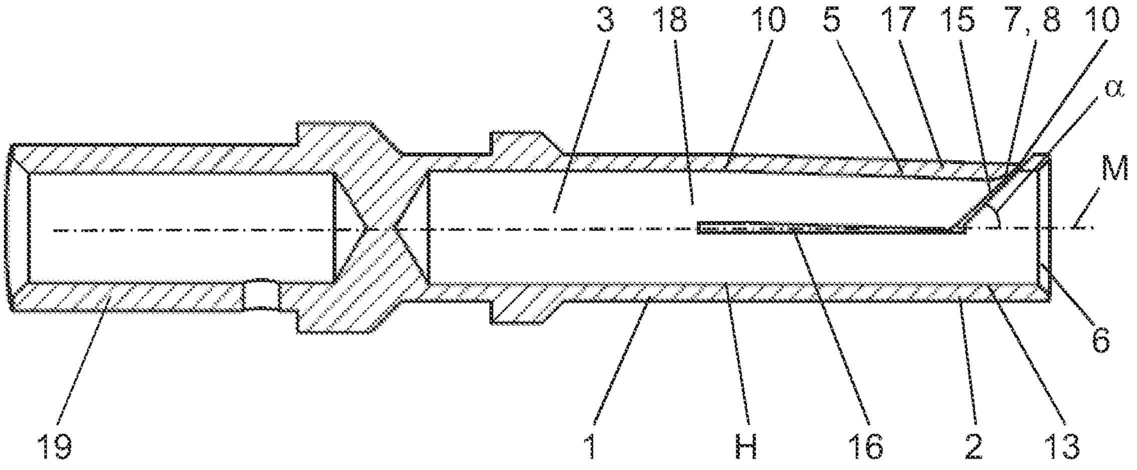
FIG. 6 shows a sectional view of the socket body according to FIGS. 3 to 4.

It can be seen clearly from FIG. 6 that the cut runs over the first section 15 in an angularly inclined manner at the angle α with respect to the center axis M. In the second section 16, the cut 4 then runs parallel to the center axis M. Other shapes of cuts such as, for example, a curved cut would likewise be conceivable.

FIGS. 7 to 12 show the second embodiment of the present invention. Identical parts are provided with identical reference signs, and reference is made to the above description.

Figure 7:
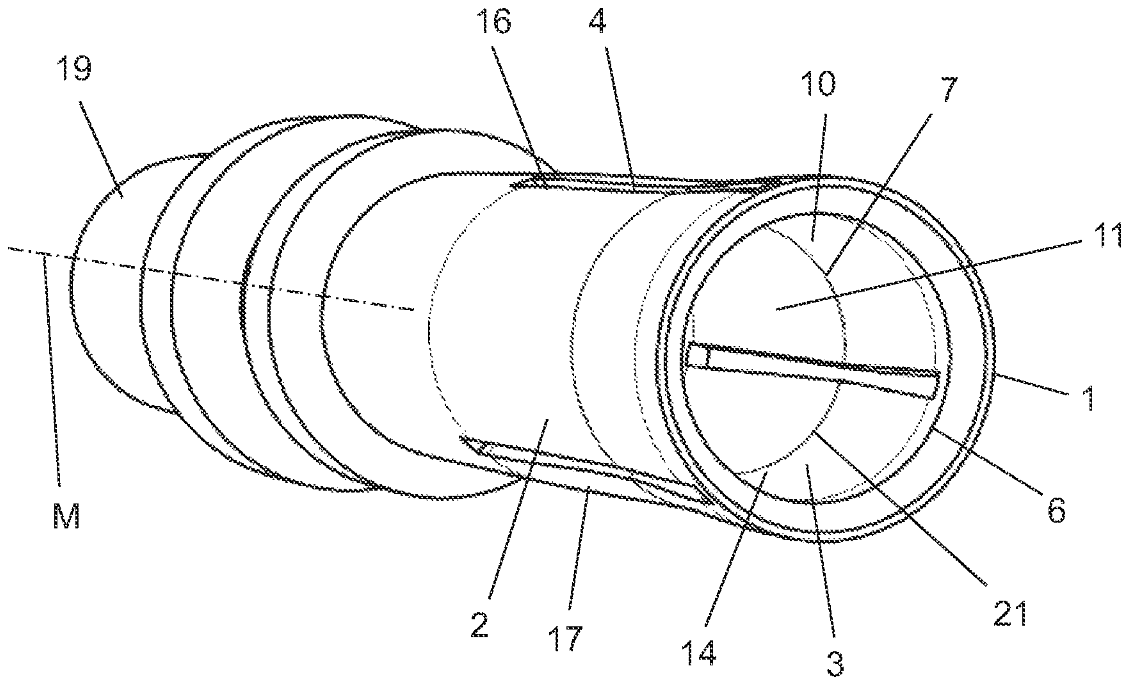
FIG. 7 shows a perspective view of a socket body according to a second embodiment of the present invention before the placement of an indentation.
Figure 8:
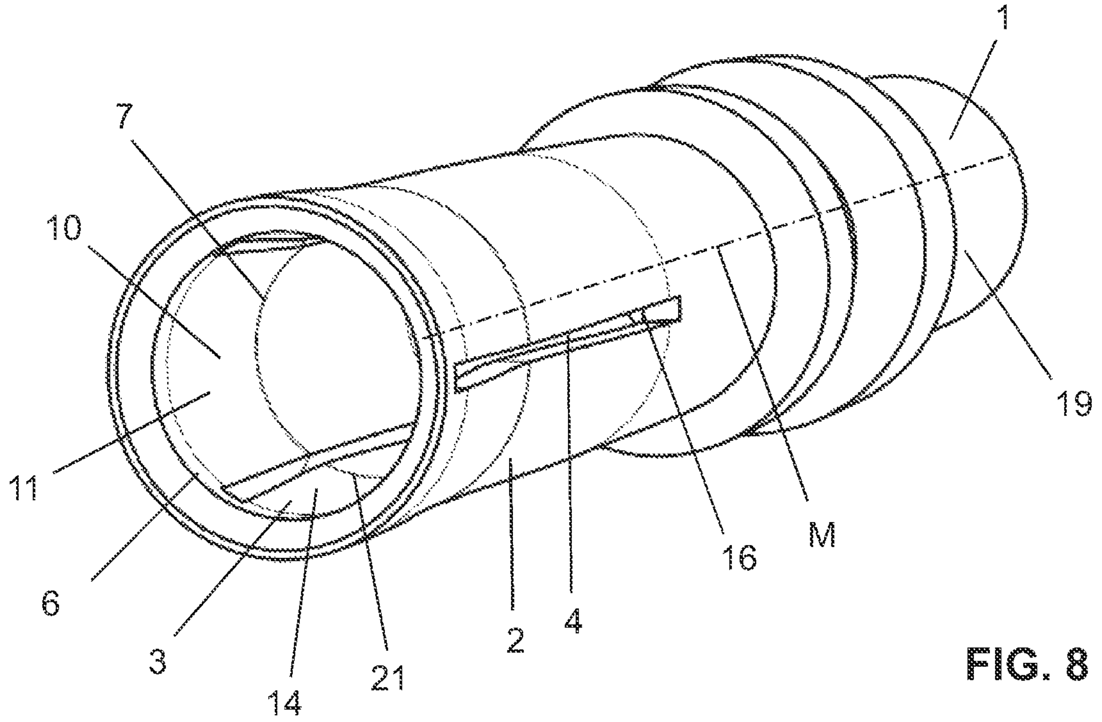
FIG. 8 shows a further perspective view of the socket body according to FIG. 7.
Figure 9:
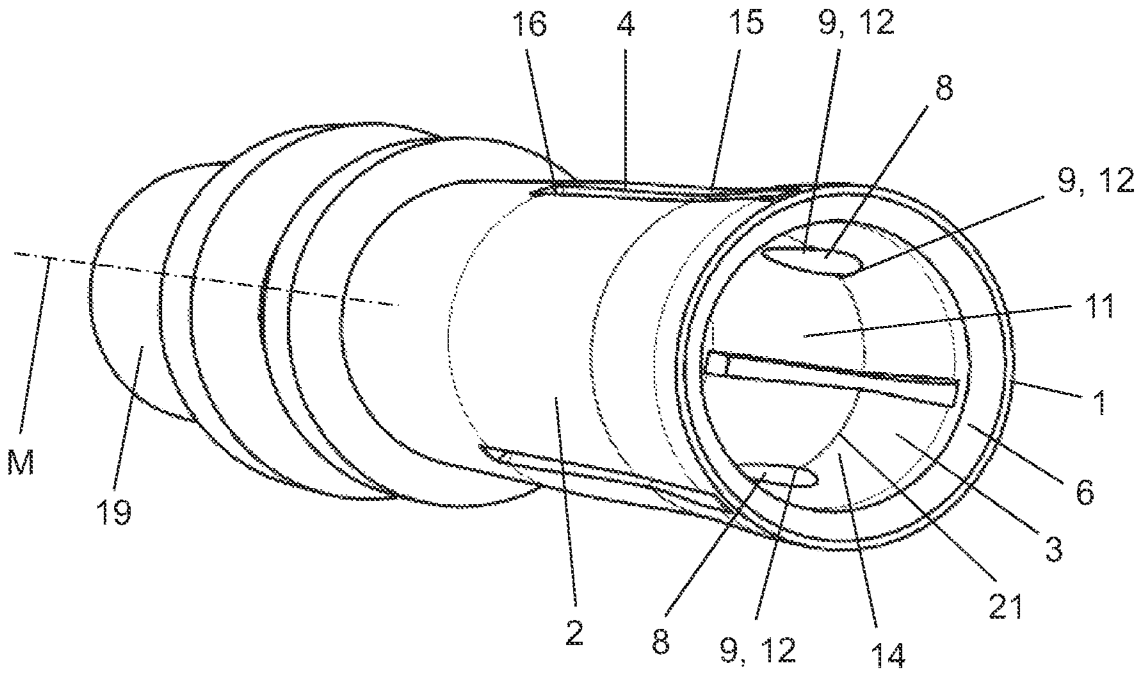
FIG. 9 shows the view according to FIG. 7 after the placement of the indentation.
Figure 10:
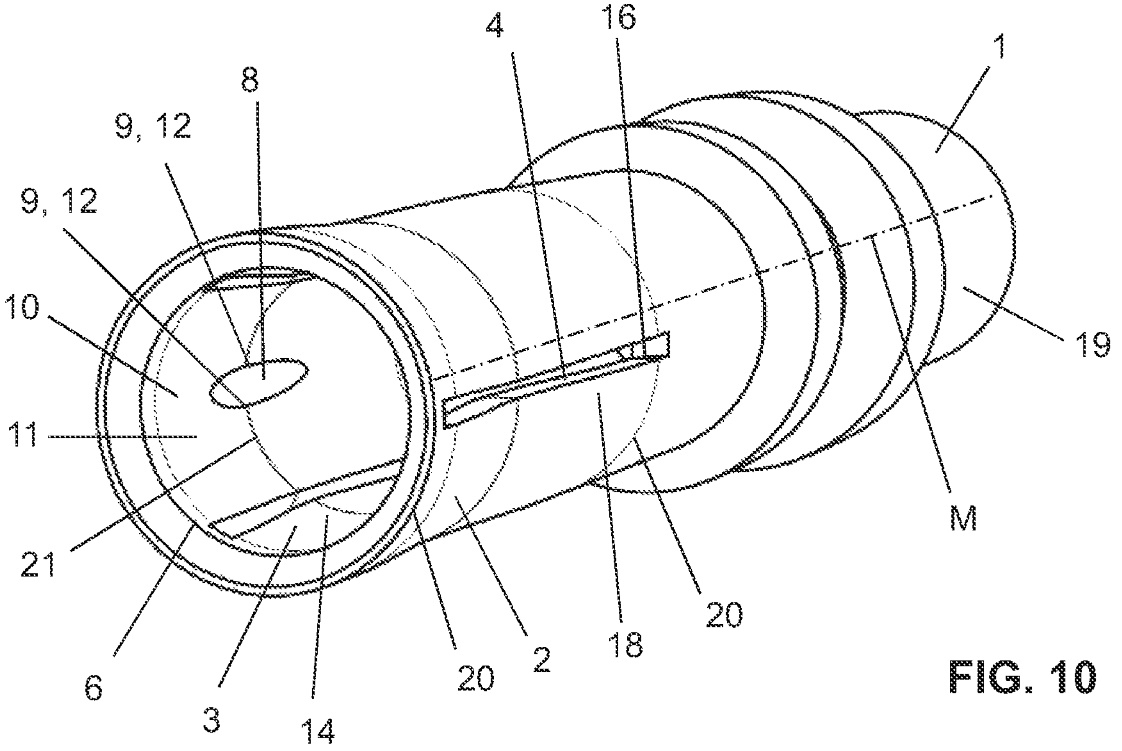
FIG. 10 shows the view according to FIG. 8 after the placement of the indentation.

FIGS. 7 to 8 show the socket body 1 in an intermediate step during production. FIGS. 9 to 12 show the finally produced socket body 1.

The second embodiment has at least one spring clip 5 which is connected at its two ends 20 fixedly to the socket body 1. In the embodiment which is shown, three spring clips 5 are arranged. The spring clip 5 protrudes radially into the socket space 3. Toward the socket space 3, the spring clip 5 has a wall face 11 which faces the socket space. The wall face 11 has a region 21 with a decreased diameter. Said indentation 8 is arranged in this region 21 with the decreased diameter. Here, the indentation extends in the direction of the center axis M through the region 21 with the decreased diameter and in the radial direction into the wall face 11. At the narrowest part, laterally with respect to said indentation, two contact locations, in particular two contact points 9, are thereby provided.

The region 21 with the decreased diameter has a diameter which is smaller than the diameter of the socket opening 6. In the embodiment which is shown, the wall face 11 extends, as viewed from the socket opening 6, conically as far as the minimum diameter and subsequently widens conically again. Here, the indentation 8 is arranged in the region of the minimum diameter.

During pushing of a plug pin into the socket space 3, the at least one spring clip is bent away from the center axis M transversely with respect to the center axis M.

The at least one spring clip 5 is provided by two cuts 4 which lie parallel to one another and parallel to the center axis M. The cuts 4 extend from the outside completely through the socket wall 2.

Figure 11:
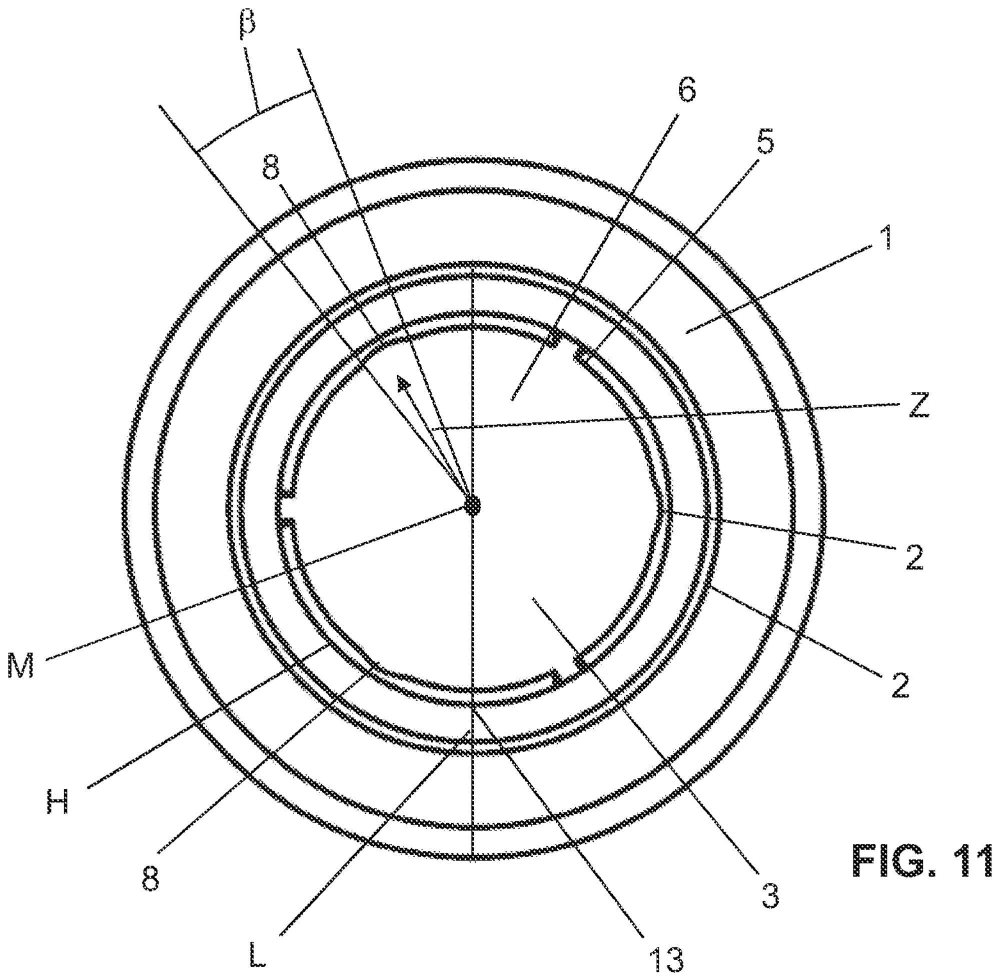
FIG. 11 shows a front view of the socket body according to FIGS. 9 to 10.

FIG. 11 shows, furthermore, the circumferential angle β of the indentation. With regard to the circumference of the socket space 3, the indentation 8 extends over a circumferential angle β of at most 25°, in particular of at most 10° or at most 5°, around the circumference. It is accordingly a very small region in which the indentation 8 is present. The angle may however also be greater than 10°.

Figure 12:
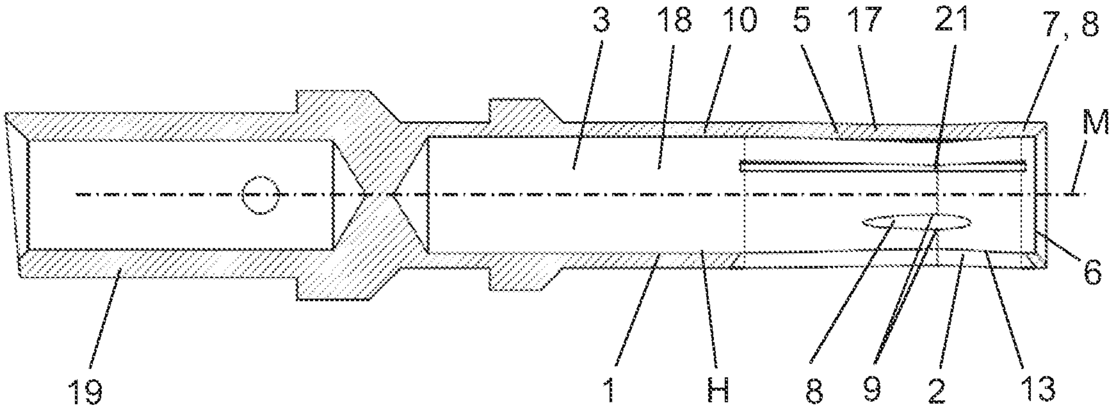
FIG. 12 shows a sectional view of the socket body according to FIGS. 9 to 10.

The sectional illustration of FIG. 12 shows that the indentation 8 extends through said region 21 with the decreased diameter. Here, the indentation 8 extends, as viewed from the minimum diameter which theoretically forms a line, in the direction of the socket opening 6 and in the direction of the contact section 19.

A method for producing a socket body 1 according to the above description in accordance with both embodiments is carried out as follows: in a first step, the socket body 1 is produced with the cut 4 and the spring clip 5. In a second step, the indentation 8 is produced, a tool for producing the indentation 8 being guided via the socket opening 6 into the socket space 3 as far as the location of the indentation. The tool can be a machining tool or an embossing stylus.

LIST OF REFERENCE SIGNS

| | |
|---|---|
| 1 | Socket body |
| 2 | Socket wall |
| 3 | Socket space |
| 4 | Cut |
| 5 | Spring clip |
| 6 | Socket opening |
| 7 | Edge |
| 8 | Indentation |
| 9 | Contact point |
| 10 | Front face |
| 11 | Wall face |
| 12 | End point |
| 13 | Third contact point |
| 14 | Surface |
| 15 | First section |
| 16 | Second section |
| 17 | Free end |
| 18 | Fixed end |
| 19 | Contact section |
| 20 | End |
| 21 | Region |
| H | Envelope cylinder |
| L | Line |
| M | Center axis |
| Z | Direction |
| α | Angle |
| β | Angle |

The invention claimed is:

1. A socket body comprising a socket space which is delimited by a socket wall and extends along a center axis for receiving a plug pin, the socket space having a socket opening, via which the plug pin can be pushed into the socket space, wherein at least one cut extends through the socket wall in such a way that at least one spring clip is formed, which spring clip is bent into the socket space, wherein the spring clip has at least one or a single indentation in such a way that one contact location or one contact point, for making contact with a plug pin which is to be pushed into the socket space is formed on either side of the indentation and wherein the spring clip has, on the front side, an edge which faces the socket space, said indentation being arranged at the edge.

2. The socket body according to claim 1, wherein the at least one indentation interrupts the edge completely in the region of the indentation.

3. The socket body according to claim 1, wherein the at least one indentation extends into a front face, facing the socket opening, of the spring clip and/or into a wall face, facing the socket opening, of the spring clip.

4. The socket body according to claim 2, wherein the at least one indentation extends into a front face, facing the socket opening, of the spring clip and/or into a wall face, facing the socket opening, of the spring clip.

5. The socket body according claim 1, wherein the at least one indentation extends into a front face, facing the socket opening, of the spring clip and/or into a wall face, facing the socket opening, of the spring clip, and wherein the at least one indentation extends from the edge, as viewed in a direction transversely with respect to the center axis, completely over the front face, or wherein the at least one indentation extends from the edge, as viewed in a direction transversely with respect to the center axis, at most over half of the front face.

6. The socket body according to claim 1, wherein the contact points are formed on the edge.

7. The socket body according to claim 1, wherein the contact points are formed on the edge and that a contact point lies at an end point of the edge which forms the transition to the indentation.

8. The socket body according to claim 1, wherein, opposite the indentation with the two contact points with regard to the center axis, a third contact point is provided by the surface of the socket wall.

9. The socket body according to claim 1, wherein, opposite the indentation with the two contact points with regard to the center axis, a third contact point is provided by the surface of the socket wall, and wherein the third contact point lies between the two contact points as viewed in the direction of the center axis, in such a way that a line which extends at a right angle with respect to the center axis and through the third contact point runs centrally between the two contact points which are provided by the indentation.

10. The socket body according to claim 1, wherein at least one further cut forms a further spring clip which is configured substantially identically to said spring clip.

11. The socket body according to claim 1, wherein the cut extends, as viewed in cross-section transversely with respect to the center axis, in an angularly inclined manner at an angle with respect to the center axis.

12. The socket body according to claim 1, wherein the cut extends, as viewed in cross-section transversely with respect to the center axis, in an angularly inclined manner at an angle with respect to the center axis and wherein the cut runs over a first section in an angularly inclined manner at the angle ($\alpha$) with respect to the center axis, and runs in a second section parallel to the center axis.

13. The socket body according to claim 1, wherein the spring clip is oriented with a free end toward the socket opening or away from the socket opening.

14. The socket body according to claim 1, wherein the indentation extends, with regard to the circumference of the socket space, over a circumferential angle ($\beta$) of at most 25°, of, in particular, at most 10° or of at most 5°.

15. The socket body according to claim 1, wherein the at least one indentation is provided by a stamped location; and/or wherein the at least one indentation is provided by plastic reshaping and/or machining of the edge.

16. The socket body according to claim 1, wherein the socket space or the socket opening defines a geometrical envelope cylinder with a circular cross section, the indentation lying exclusively in the interior of the envelope cylinder.

17. The socket body according to claim 1, wherein, in a first step, the socket body is produced with the cut and the spring clip; and wherein, in a second step, the indentation is produced, a tool for producing the indentation being guided via the socket opening into the socket space as far as the edge.

18. A method for producing a socket body according to claim 1, wherein in a first step, the socket body is produced with the cut and the spring clip; and wherein, in a second step, the indentation is produced, a tool for producing the indentation being guided via the socket opening into the socket space as far as the location of the indentation.

19. A socket body comprising a socket space which is delimited by a socket wall and extends along a center axis for receiving a plug pin, the socket space having a socket opening, via which the plug pin can be pushed into the socket space, wherein at least one cut extends through the socket wall in such a way that at least one spring clip is formed, which spring clip is bent into the socket space, wherein the spring clip has at least one or a single indentation in such a way that one contact location or one contact point, for making contact with a plug pin which is to be pushed into the socket space is formed on either side of the indentation, and wherein the spring clip has a wall face which faces the socket space, the wall face which faces the socket space having a region with a decreased diameter, and the indentation extending into the wall face in the region with the decreased diameter.

20. The socket body according to claim 19, wherein the region with the decreased diameter has a diameter which is smaller than the diameter of the socket opening.

21. The socket body according to claim 19, wherein said region has a minimum internal diameter, the indentation extending through this minimum internal diameter as viewed in the direction of the center axis.

22. The socket body according to claim 19, wherein said region has a minimum internal diameter, the indentation extending through this minimum internal diameter as viewed in the direction of the center axis.

23. The socket body according to claim 19, wherein there are at least two spring clips, which spring clips are arranged in a uniformly distributed manner around the circumference of the socket opening.

24. The socket body according to claim 19, wherein the at least one spring clip is connected on each end to the socket wall, and wherein the region with the decreased diameter lies between the two connection locations, and/or wherein the spring clip is formed on both sides by a cut, the cuts extending parallel to the center axis.

25. The socket body according to claim 19, wherein at least one of the indentations lies centrally on the spring clip as viewed in the direction of the center axis.

26. The socket body according to claim 19, wherein the indentation extends, with regard to the circumference of the socket space, over a circumferential angle of at most 25°, of, in particular, at most 10° or of at most 5°.

27. The socket body according to claim 19, wherein the at least one indentation is provided by a stamped location; and/or wherein the at least one indentation is provided by plastic reshaping and/or machining of the edge.

28. The socket body according to claim 19, wherein the socket space or the socket opening defines a geometrical envelope cylinder with a circular cross section, the indentation lying exclusively in the interior of the envelope cylinder.

29. The socket body according to claim 19, wherein, in a first step, the socket body is produced with the cut and the spring clip; and wherein, in a second step, the indentation is produced, a tool for producing the indentation being guided via the socket opening into the socket space as far as the edge.

30. A method for producing a socket body according to claim 19, wherein in a first step, the socket body is produced with the cut and the spring clip; and wherein, in a second step, the indentation is produced, a tool for producing the indentation being guided via the socket opening into the socket space as far as the location of the indentation.

* * * * *